No. 707,908. Patented Aug. 26, 1902.
G. W. DUNHAM & J. W. FOX.
FOOT WARMER FOR VEHICLES.
(Application filed Oct. 25, 1901.)
(No Model.) 2 Sheets—Sheet 1.
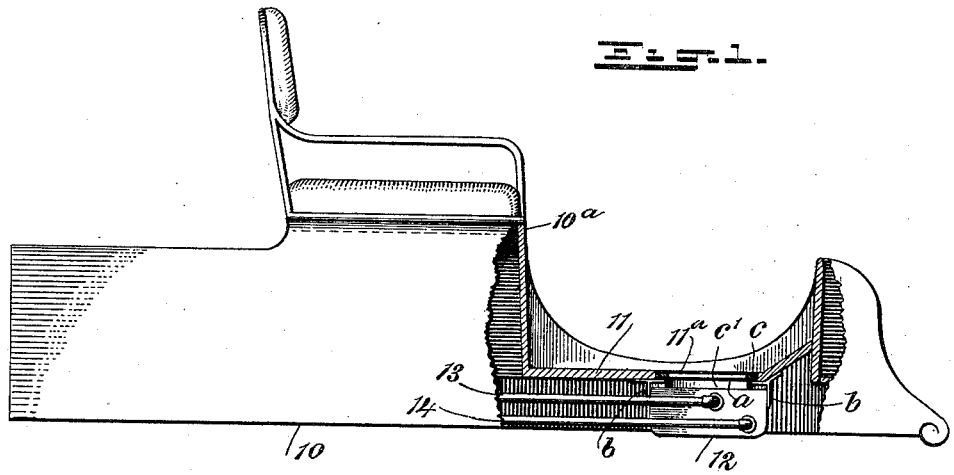
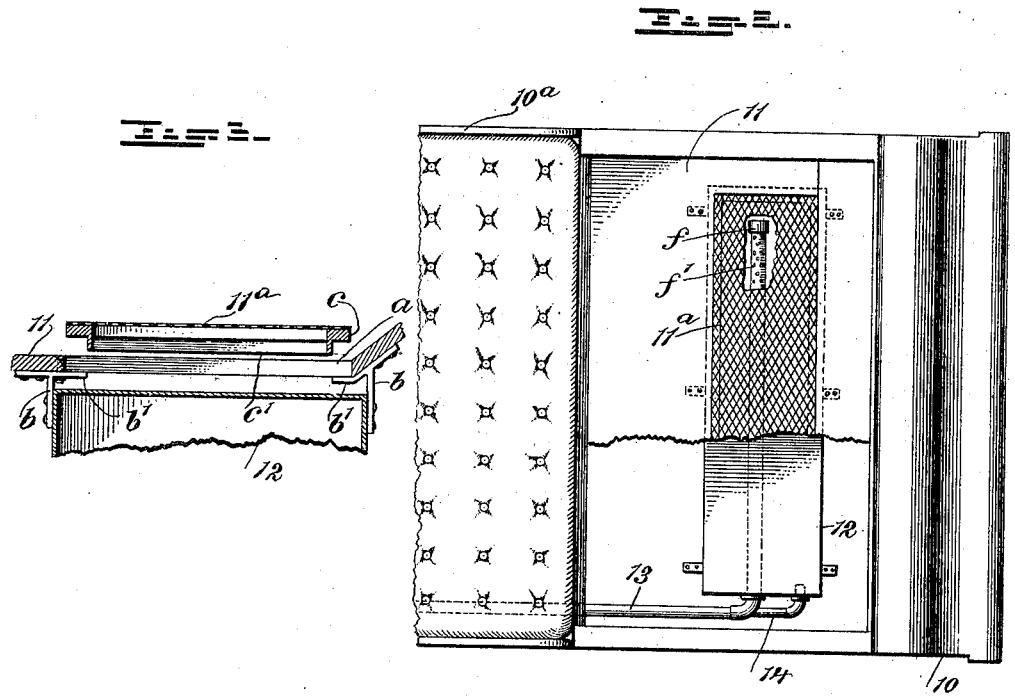
WITNESSES:
INVENTORS
George W. Dunham
John W. Fox
BY
ATTORNEYS No. 707,908. Patented Aug. 26, 1902.
G. W. DUNHAM & J. W. FOX.
FOOT WARMER FOR VEHICLES.
(Application filed Oct. 25, 1901.)
(No Model.) 2 Sheets—Sheet 2.
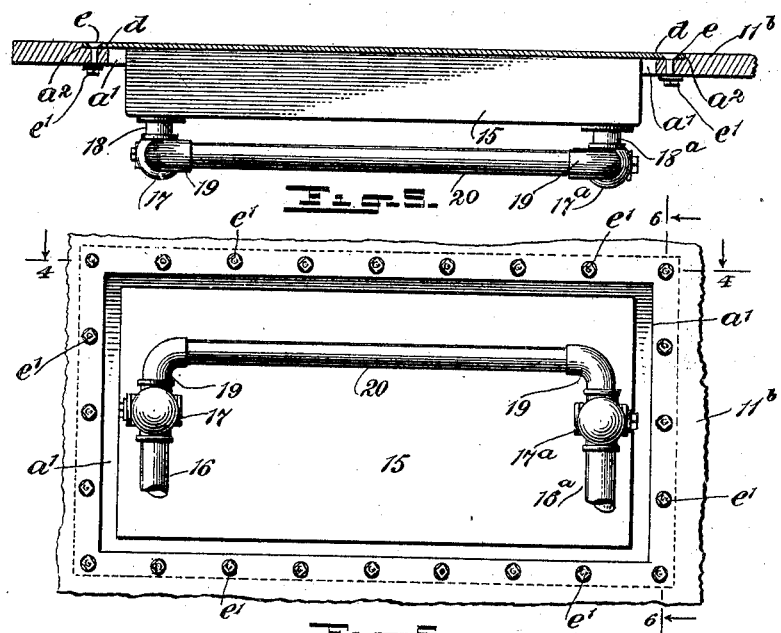
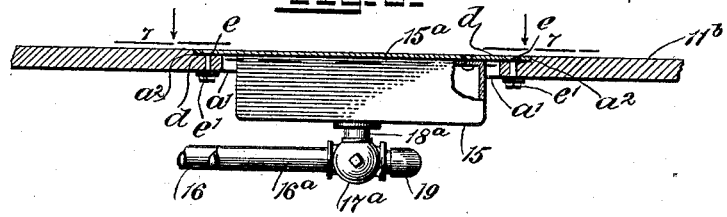
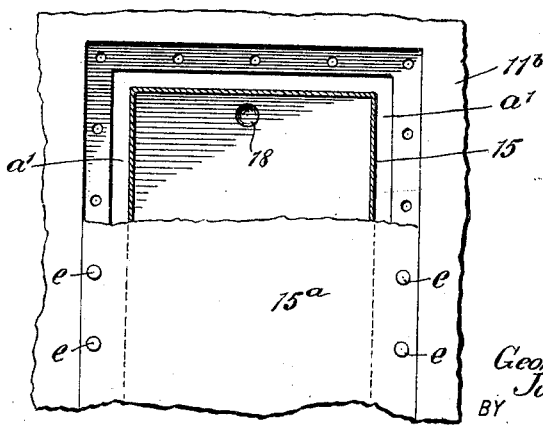
WITNESSES:
INVENTORS
George W. Dunham
John W. Fox
BY
ATTORNEYS

UNITED STATES PATENT OFFICE.

GEORGE W. DUNHAM AND JOHN W. FOX, OF EAST CLEVELAND, OHIO.

FOOT-WARMER FOR VEHICLES.

SPECIFICATION forming part of Letters Patent No. 707,908, dated August 26, 1902.

Application filed October 25, 1901. Serial No. 79,934. (No model.)

*To all whom it may concern:*

Be it known that we, GEORGE W. DUNHAM and JOHN W. FOX, citizens of the United States, and residents of East Cleveland, in the county of Cuyahoga and State of Ohio, have invented a new and Improved Foot-Warmer for Vehicles, of which the following is a full, clear, and exact description.

This invention has for its object to provide a foot-warmer for vehicles adapted to utilize the waste heat resulting from combustion of fuel for propulsion of a vehicle, such as an automobile, actuated by a motor using gas or steam for its motive agent or to utilize the water-cooling circulation of automobiles actuated by gasolene.

The invention consists in the novel construction and combination of parts, as hereinafter described, and defined in the appended claims.

Reference is to be had to the accompanying drawings, forming a part of this specification, in which similar characters of reference indicate corresponding parts in all the figures.

Figure 1 is a partly-sectional side view of a vehicle-body and of details of the invention thereon. Fig. 2 is an enlarged plan view of the features of the invention shown in Fig. 1. Fig. 3 is a sectional side view of portions of the heating device constructed as represented in Figs. 1 and 2. Fig. 4 is a transverse sectional view of details substantially on the line 4 4 in Fig. 5, showing a modified construction of the heating apparatus. Fig. 5 is a bottom plan view of parts represented in Fig. 4. Fig. 6 is a transverse sectional view substantially on the line 6 6 in Fig. 5, and Fig. 7 is a broken and partly-sectional plan view of details substantially on the line 7 7 in Fig. 6.

The essential features of this invention embody a sealed chamber hung from the under side of the footboard of a vehicle having a motor, a grating, or other heat-transmitting medium forming a part of the footboard, pipes and attachments thereto adapted to lead waste heat or exhaust-steam from the motor that propels the vehicle into and from the chamber and impart heat thereto, from which chamber the heat radiates upwardly to serve as a foot-warming medium.

The body 10, shown to illustrate the application of the improvement, may be of any preferred design available for the accommodation of persons occupying the vehicle as a means of conveyance, there being a footboard 11 forward of the seat $10^a$, as usual. A preferably rectangular aperture $a$ is formed transversely in the footboard 11 of suitable dimensions for free transmission of heat therethrough, and if the motor employed for propulsion of the vehicle is one having compressed gas or gasolene as a motive agent a grating $11^a$ is removably seated over and in the aperture $a$, as shown in Figs. 1, 2, and 3 of the drawings. Directly below the aperture $a$ a plate-metal receiving-chamber 12 is hung by the knee-brackets $b$, leaving an air-space of suitable depth between the top plate of the receiver 12 and the lower side of the footboard 11. Members $b'$, formed on the brackets $b$, extend into the opening $a$, as best shown in Fig. 3, and in said figure and also in Fig. 1 a metal frame $c$ is shown, whereon the grating $11^a$ is mounted and secured. The frame $c$ is rabbeted on the outer side, providing a horizontal flange thereon and a depending flange $c'$, the horizontal flange fitting loosely in the aperture $a$ and seating on the bracket members $b'$, disposing the depending flange portion $c'$ in contact with the top wall of the receiver and heat-radiator 12. A conduit-pipe 13 for conducting hot exhaust products of combustion from a gas or vapor engine, (not shown,) which in this construction is employed as the motor for the vehicle, is introduced at one end of the receiver 12 and extends longitudinally therein, as shown in Fig. 2, this portion of the conduit-pipe being sealed at the end $f$ and perforated in the body, as at $f'$, for the free escape of the hot waste gaseous products discharged from the engine. An escape-pipe 14 extends from the same end of the receiver 12 through which the conduit-pipe 13 enters, and said escape-pipe trends rearwardly for the discharge of the gaseous fumes at the rear of the vehicle.

It will be seen that in operation the exhaust-products of combustion conducted from the motor to the receiver 12 will quickly fill the same and heat it, and as the top wall of this sealed chamber is of thin plate metal heat will be radiated upwardly therefrom through the grating $11^a$ as a medium for warming the feet of the occupants of the seat $10^a$.

In Figs. 4, 5, 6, and 7 the apparatus is shown modified in details to facilitate the use of exhaust-steam, if the motor for the vehicle is actuated by steam as a motive agent, or the use of the water-cooling circulation of vehicles actuated by gasolene. In this construction the footboard 11$^b$ of the vehicle is apertured, as before explained, said aperture $a'$ having the border edge rabbeted, as shown at $a^2$ in Figs. 4 and 6, to afford a shallow depressed seat whereon the flanged edge portion $d$ of the top plate 15$^a$ of the receiver 15 is imposed and secured by the bolts $e$ and nuts $e'$, which bolts engage alined perforations in the flange $d$ and footboard 11$^b$, the nuts bearing upon the latter, as indicated in Figs. 4, 5, and 6. A sufficient space is provided between the receiver 15 and the edge of the aperture $a'$ to prevent heat from burning the footboard 11$^b$, and the top plate 15$^a$ may be formed of either plate metal or asbestos board, as may be preferred. An exhaust-conducting pipe 16 is extended from the motor of the vehicle, (not shown,) which pipe at the forward end is provided with an ordinary two-way valve 17, one outlet of the valve engaging a nipple 18, secured upon the bottom wall of the receiver 15 and registering with an opening therein near one side wall of the receiver. A similar nipple 18$^a$ depends from the bottom plate of the receiver 15 below another orifice therein near the opposite side wall of said receiver, and a two-way valve 17$^a$, similar to the valve 17, is secured on the lower end of the nipple 18$^a$, as shown in the drawings. From one side of the two-way valve 17$^a$ a discharge-pipe 16$^a$ projects toward the rear end of the vehicle for conducting away the exhaust product that has done duty in the receiver 15 and also to remove condensed water. At the ends of the valves 17 17$^a$, directly opposite the ends engaged by the pipes 16 16$^a$, an L-fitting 19 is secured on each valve, and between said fittings a pipe 20 is extended, the fittings and their pipe connection together providing a by-pass for the exhaust product led forwardly in the conduit-pipe 16.

The operation of the apparatus shown in Figs. 4 to 7 is similar to that of the device hereinbefore described, wherein hot gaseous waste products are employed for the same purpose. This is apparent, as exhaust-steam conducted to the valve 17 will, if said valve is adjusted to pass steam through the nipple 18 into the receiver 15, expand and fill said sheet-metal receiver, heat the top plate of the receiver, and then escape therefrom into the discharge-pipe 16$^a$, this operation continuing while the vehicle is in motion and the valves are adjusted as stated. When it is desired to dispense with heating of the foot-plate 15$^a$, forming the top plate of the receiver 15, this can be readily effected by adjusting the valves 17 17$^a$ so as to cut steam off from the receiver and pass it around through the by-pass, composed of the L-fittings 19 and connecting-pipe 20, there being a straightway-passage through the valves and by-pass from the conduit-pipe 16 into the escape-pipe 16$^a$, that will discharge the exhaust-steam at the rear end of the vehicle. If preferred, the grating 11$^a$ may be dispensed with and a cover of wood or other material be fitted in the opening $a$, this provision being available in case the heating device is not needed for service.

While the form of the receiver and the warming plate or grating above it in the footboard of the vehicle is best suited for effective service when given rectangular oblong form, as shown, they obviously may be given a circular or other shape, if preferred.

It is to be understood that the receiving-chamber may be the muffler employed on automobiles, or it may be a separate tank, if found desirable or rendered necessary by the construction of the vehicle. It is also to be understood that in the construction shown in Figs. 4 to 7 the water-cooling circulation of machines employing gasolene as a motive agent may be utilized.

Having thus described our invention, we claim as new and desire to secure by Letters Patent—

1. The combination with a motor-vehicle having a protected aperture in its footboard, of a receiving-chamber, means for suspending the receiving-chamber from the footboard below the aperture thereof, a pipe leading to the receiving-chamber for supplying a heating medium to said chamber, and a pipe leading from said chamber and extending rearwardly to discharge the spent heating medium at the rear of the vehicle, as set forth.

2. A foot-warmer for vehicles, comprising a rectangular plate-metal receiver, adapted to be hung in an opening in the footboard of the vehicle, two two-way valves hung with nipples below corresponding openings in the bottom of the receiver at opposite ends thereof, a by-pass pipe connected by fittings upon like ends of the valves, a conduit-pipe for a heating agent engaging the other end of one of the two-way valves, and an escape-pipe extending from the corresponding end of the other two-way valve.

3. The combination with a vehicle having an aperture in its footboard, of a receiving-chamber having a top plate extending beyond the chamber and resting upon the footboard, nipples projecting from the bottom of the chamber at opposite ends thereof, a two-way valve connected with each nipple, a by-pass pipe connected with one end of the said valves, a conduit-pipe connected with the other end of one of the two-way valves, and an escape-pipe connected with the corresponding end of the other two-way valve, as set forth.

In testimony whereof we have signed our names to this specification in the presence of two subscribing witnesses.

GEORGE W. DUNHAM.
JOHN W. FOX.

Witnesses:
CATHERINE C. HYLAND,
DENIS J. JORDEN.